(12) United States Patent
Smith

(10) Patent No.: US 6,739,210 B1
(45) Date of Patent: May 25, 2004

(54) DEVICE FOR CONTROLLING AN ENGINE

(75) Inventor: Kenneth Smith, Boblingen (DE)

(73) Assignee: Wittenstein GmbH & Co. KG, Igersheim (DE)

( * ) Notice: Subject to any disclaimer, the term of this patent is extended or adjusted under 35 U.S.C. 154(b) by 108 days.

(21) Appl. No.: 10/009,074

(22) PCT Filed: Jun. 6, 2000

(86) PCT No.: PCT/EP00/05135

§ 371 (c)(1),
(2), (4) Date: Mar. 8, 2002

(87) PCT Pub. No.: WO00/76843

PCT Pub. Date: Dec. 21, 2000

(30) Foreign Application Priority Data

Jun. 11, 1999 (DE) .......................... 199 26 563

(51) Int. Cl.$^7$ .............................. F16H 59/00
(52) U.S. Cl. ....................................... 74/335; 74/336 R
(58) Field of Search .............................. 74/335, 336 R, 74/337, 469, 491; 700/287, 290; 701/3, 11, 14

(56) References Cited

U.S. PATENT DOCUMENTS 4,039,804 A * 8/1977 Reed et al. ................. 700/287
5,033,010 A * 7/1991 Lawrence et al. ............ 701/35

\* cited by examiner

*Primary Examiner*—David Fenstermacher
(74) *Attorney, Agent, or Firm*—Bachman & LaPointe, P.C.

(57) ABSTRACT

A device for controlling an engine, in particular of an aircraft. The device comprises at least one throttle and a regulating device for additionally controlling the throttle automatically. A displacement of the throttle is transmitted permanently, in a direct or indirect manner to a position sensor.

10 Claims, 2 Drawing Sheets

DEVICE FOR CONTROLLING AN ENGINE

The present invention relates to an arrangement for controlling an engine, in particular of an aircraft, having at least one gas lever, mounted in a housing in a movable manner and assigned to a guide element, and a regulating device for the additional automatic driving of the gas lever.

Such arrangements are known and are common on the market in a wide variety of forms and designs. They serve in particular to control and start up an engine, for example of an aircraft.

A disadvantage with such conventional arrangements is that they do not provide sufficient safety if, for example during operation with an autopilot, the electric circuit or even the regulating motor fails.

It is then often disadvantageous that the pilot is not able to recognize the actual situation and position of the gas lever or the operating state of the engine.

This may have considerable undesirable consequences, in particular it may even result in aircraft crashing.

GB 2 114 717 A discloses a control device for aircraft or ships, a control rod, for example, being linearly movable and being guided in a linear manner. In this case, this linear movement can be assisted by means of a spindle and an electric motor.

The object of the present invention is to provide an arrangement of the type mentioned at the beginning in which an engine can be permanently controlled manually and/or automatically in a simple, reliable and cost-effective manner.

This object is achieved by virtue of the fact that a rotational, manual and/or automatic movement of the gas lever can be transmitted mechanically to a displacement measuring system.

In the present invention, the gas lever sits on a spindle which can be driven via a regulating motor for operation by means of autopilot. The pilot then recognizes the current state, in particular the operating state, of the engine in every position and situation.

If, for example, this regulating motor fails, he can manually actuate the gas lever. A guide element, on which a displacement measuring system sits, rotates due to the actuation of the gas lever. This displacement measuring system then transmits the corresponding information directly or indirectly via a computer to the engine. The movement of the gas lever is then independent of the regulating motor.

It should also be within the scope of the present invention to use other displacement measuring systems which, for example, are suitable for detecting a rotary movement or a linear movement of the gas lever and for converting said rotary movement or linear movement into a signal.

In this case, the displacement measuring system may be of an inductive, magnetic and/or optical type. There is no limit to the invention in this respect.

Furthermore, it is important in the case of the present invention that the gas lever is guided rotationally and radially in a guide slot on a guide element which executes a rotary movement about an axis. This rotary movement of the guide element is then transmitted to the displacement measuring system.

Furthermore, it is advantageous in the case of the present invention that, without electrical power, a rotational movement of the guide element is transmitted directly to the displacement measuring system by purely manual movement of the gas lever. The displacement measuring system then delivers the corresponding signals for controlling the engine. As a result, the safety for controlling and starting up an engine is additionally increased.

Further advantages, features and details of the invention follow from the description below of preferred exemplary embodiments and with reference to the drawing, in which.

Figure 1:
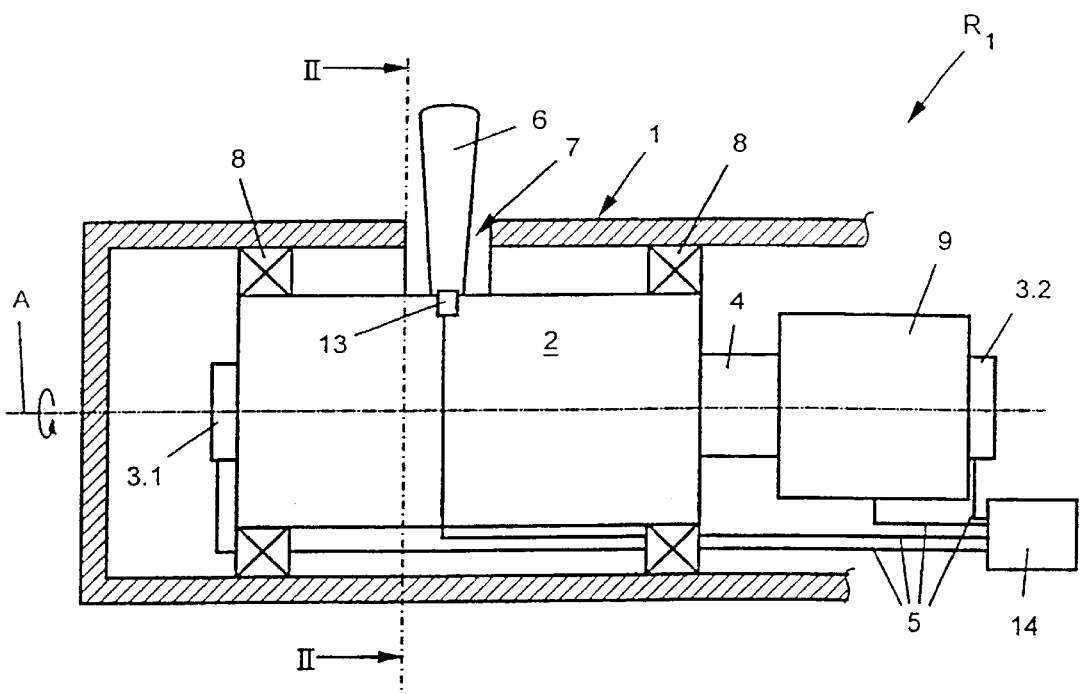
FIG. 1 shows a schematic longitudinal section through an arrangement for controlling an engine.

According to FIG. 1, an arrangement $R_1$ according to the invention for controlling an engine (not shown here), in particular of an aircraft, has a housing 1 in which a guide element 2 is mounted, preferably in its longitudinal direction, in such a way as to be rotatable about an axis A. A displacement measuring system 3.1 sits on one end of the guide element 2, and the regulating device 9, in particular an electric motor, sits on the other end via a shaft coupling 4. Likewise allocated to the regulating motor at the end is a displacement measuring system 3.2, which is connected to a control 14 via connecting lines 5.

The guide element 2 is mounted in the housing 1 via bearing elements 8 in such a way as to be rotatable about the axis A.

The guide element 2 is connected to a gas lever 6, which projects from a guide slot 7 of the housing 1. The guide slot 7, as also shown in particular in FIG. 2, is preferably provided in a radially encircling manner in the housing 1.

A force sensor 13 is assigned to the gas lever 6 and/or the guide element 2, and this force sensor 13, and also the regulating device 9, are likewise connected to the control 14 via the connecting line 5.

The displacement measuring system 3.1 may likewise be connected to the control 14.

Figure 2:
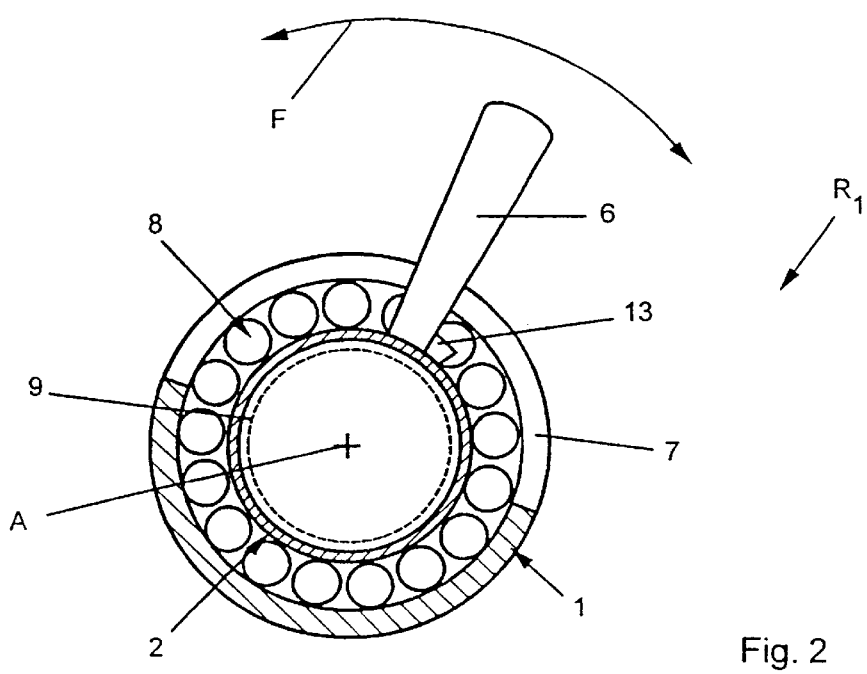
FIG. 2 shows a schematic cross section through the arrangement for controlling an engine according to FIG. 1 along line II—II.

As can be seen from FIG. 2, the gas lever 6 can be moved manually in a rotational manner about the axis A, in the course of which a movement can be transmitted mechanically to the displacement measuring systems 3.1, 3.2. The latter deliver the corresponding signals, if need be via a computer, to the engine, in order to start the engine. The operating state of the engine can be detected according to the position of the gas lever 6.

If, for example, the regulating device 9, in particular the regulating motor, fails, the engine can be controlled manually by rotation of the guide element 2 by means of the gas lever 6, since the displacement measuring systems 3.1 and 3.2 transmit the corresponding signals inductively, magnetically or optically.

The engine and in particular the control of the engine are therefore protected through a power failure, for example of the regulating device 9, in particular of the regulating motor.

Figure 3:
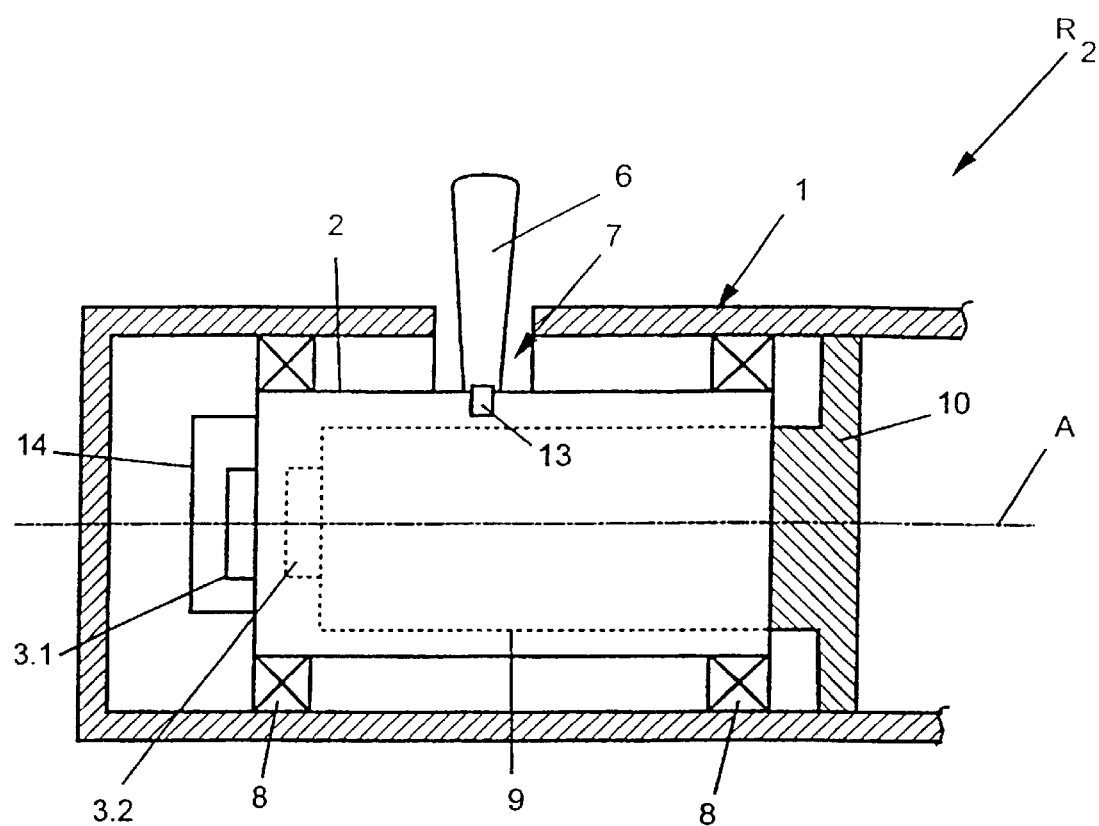
FIG. 3 shows a schematic longitudinal section through a further exemplary embodiment of the arrangement for controlling an engine according to FIG. 1.

In the exemplary embodiment of the present invention according to FIG. 3, the regulating device 9, in particular the regulating motor, is mounted in a rotatable manner inside the guide element 2, as shown by broken lines, the regulating device 9 and guide element 2 being in engagement with one another. In this case, the regulating motor or the regulating device 9 is supported outside the guide element 2 on the housing 1 and is firmly connected to the latter in a releasable manner via a flange 10.

This permits a compact type of construction which can be produced cost-effectively.

If an aircraft is operated, for example, by means of an autopilot, the gas lever 6 is moved along by means of the regulating motor 9 in accordance with the control of the aircraft, so that the pilot, in every situation, recognizes the operating state of the engine from the position of the gas lever 6 in the guide slot.

At the same time, in the case of manual operation, an operating state is transmitted to a computer (not shown here) of the aircraft either via the regulating motor 9 and/or via the displacement measuring system 3.1, 3.2., if need be also via the control 14, this computer then directly activating the corresponding engine.

It is especially advantageous in the case of the present invention that the gas lever 6 can be effected manually, or if the regulating motor fails, and that the pilot recognizes the present operating state of the engine on the basis of the rotational rotatable situation of the gas lever in its position.

He can manually shift the gas lever in a purely mechanical manner, as a result of which a rotational movement of the guide element 2 is transmitted to the displacement measuring systems 3.1, 3.2. This rotary movement is determined there and is transmitted to the corresponding computer for controlling the engine.

It is therefore also still possible, for example in the event of a power failure, to transmit the electrical signal from the displacement measuring system 3.1, 3.2 to the engine. This is of fundamental importance in the case of the present invention, since the safety of the aircraft is considerably increased with a corresponding arrangement for operating an engine.

In the event of an electrical failure of the system, no self-locking occurs. The gas lever 6 can be moved manually by hand, in which case the original position and setting of the operating state of the engine can be seen in every situation.

The control 14 at least partly takes over the guided movement of the gas lever, e.g. by moving the guide element 2 by means of the regulating device 9, in particular regulating motor, if, for example, the force sensor 13 is actuated. The regulating motor 9 is then accordingly connected to load in order to electrically assist the manual movement of the gas lever 6. The control 14 may be an external component of the housing 1 or of the regulating device 9. This is to be included by the present idea of the invention.

If the aircraft is flying in autopilot operation, the guide lever is correspondingly moved along via the regulating device 9.

If the gas lever 6 is actuated manually, a force F is introduced to the gas lever 6 manually, as shown in the direction of the double arrow according to FIG. 2, this force F being determined in the sensor 13. The latter then connects the regulating device 9 to load via the control 14, so that a manual rotary movement of the gas lever 6 is assisted and directed automatically by the regulating device 9, in particular the regulating motor.

As a result, the gas lever 6 can be moved back and forth about the axis A in a very easy and smooth manner.

The pilot does not have to set the gas lever 6, in particular the guide element 2, in corresponding rotation manually by his own force under any circumstances in order to change an operating state of an adjoining engine.

LIST OF ITEM NUMBERS

1 Housing
2 Guide element
3 Displacement measuring system
4 Shaft coupling
5 Connecting line
6 Gas lever
7 Guide slot
8 Bearing element
9 Regulating device
10 Flange
11
12
13 Force sensor
14 Control
$R_1$ Arrangement
$R_2$ Arrangement
F Force
A Axis

What is claimed is:

1. An arrangement for controlling an engine comprises:
   a housing;
   a guide element movably mounted in the housing for rotational movement about an axis A;
   at least one manually movable gas lever connected with the guide element for rotation therewith;
   means for measuring displacement of the at least one gas lever connected to the guide element;
   force sensor means associated with at least one of the gas lever and guide element; and
   a regulating device for automatic driving of the gas lever wherein the regulating device is activated in response to a signal from the force sensor means.

2. The arrangement as claimed in claim 1, wherein a movement of the gas lever is transmitted to the displacement measuring system means.

3. The arrangement as claimed in claim 2, wherein a movement of the gas lever is coupled mechanically to the movement of a displacement measuring means.

4. The arrangement as claimed in claim 1, wherein the regulating device comprises a motor having associated with the means for measuring displacement measuring system on the guide element.

5. The arrangement as claimed in claim 4, wherein the associated displacement measuring system is a displacement transducer.

6. The arrangement as claimed in claim 1, wherein one of the means for measuring displacement, the force sensor, and the regulating device, is connected to a control to assist movement of the gas lever by connecting the regulating device to a load, wherein the positions of the gas lever are transmitted the means measuring displacement to the engine in accordance with the operating state of same.

7. The arrangement as claimed in claim 1, wherein the gas lever is guided in a guide slot of a housing, the guide slot being arranged so as to run approximately radially relative to the guide element.

8. The arrangement as claimed in claim 7, wherein the guide element is rotatable relative to the housing.

9. The arrangement as claimed in claim 1, wherein the regulating device is in engagement with the guide element.

10. The arrangement as claimed in claim 1, wherein the regulating device is connected to the housing in a fixed position.

* * * * *